United States Patent [19] [11] 3,961,112
Genevitz et al. [45] June 1, 1976

[54] LUMINOUS EMBOSSABLE TAPE
[76] Inventors: Roberta L. Genevitz; Joseph R. Genevitz, both of 2613 Chinchilla Drive, Wilmington, Del. 19810; John B. Sowell, 182 Midfield Road, Ardmore, Pa. 19003
[22] Filed: Aug. 2, 1974
[21] Appl. No.: 494,351

[52] U.S. Cl. .................... 428/29; 428/40; 428/142; 428/172; 428/212; 428/526; 428/913; 40/130 R; 40/2 R
[51] Int. Cl.² .......................... B44F 1/10
[58] Field of Search ........... 161/182, 191, 406, 408, 161/413, 6, 116, DIG. 3; 428/526, 913, 142, 212, 40, 29, 156, 172

[56] References Cited
UNITED STATES PATENTS

| 2,716,082 | 8/1955 | Smith | 161/182 X |
|---|---|---|---|
| 3,118,781 | 1/1964 | Downing | 428/458 X |
| 3,119,729 | 1/1964 | Ljungbo | 161/191 X |
| 3,125,484 | 3/1964 | Weiss | 161/408 X |
| 3,379,560 | 4/1968 | Tharp | 161/DIG. 3 |
| 3,542,630 | 11/1970 | Pfiffner | 161/406 X |
| 3,767,517 | 10/1973 | Williams | 161/191 X |
| 3,908,065 | 9/1975 | Stigen | 428/156 X |

*Primary Examiner*—William J. Van Balen
*Assistant Examiner*—Patricia C. Ives
*Attorney, Agent, or Firm*—John B. Sowell

[57] ABSTRACT

An embossable laminate tape comprising an intermediate layer having a luminous material entrapped therein. When the tape is cold formed by embossing with indicia means, selective areas of the luminous material are exposed to provide luminous indicia on the embossed tape.

11 Claims, 10 Drawing Figures

LUMINOUS EMBOSSABLE TAPE

BACKGROUND OF THE INVENTION

1. Field of the Invention

This invention relates to machine embossable tape and more particularly to a novel embossable tape which exposes luminous indicia when embossed.

2. Description of the Prior Art

Heretofore, it was known that reflective or luminous adhesive tapes could be made by applying the luminous material to one surface of a flexible tape or webs and an adhesive to the reverse side of the tape. Such prior art luminous tapes exposed the luminous material to the atmosphere which caused deterioration. Transparent layers have been placed over the face of the luminous material to protect it from the environment. Such tapes have introduced problems when the transparent layers were added as a hardenable liquid because the transparent layer became brittle causing cracks and leaks. When flexible transparent layers were applied over the luminous material, there was a problem of selecting a transparent adhesive which would hold the outer flexible sheet without disturbing the luminous material. It is generally known that when luminescent materials are mixed with adhesives, paint or a carrier vehicle that some of the luminous nature of the material is lost.

Heretofore embossable tapes generally had an opaque cold embossable base sheet of paper, cardboard, metal, plastic or other deformable material and had a plasticized film formed on the front face thereof. Such tapes usually had an adhesive layer on the reverse face of the base sheet which was covered with strippable backing. Such cold embossable tapes are commercially well known and need not be described in detail. When such embossable tape is cold formed, the plasticized film ruptures at the embossed regions exposing the permanent embossment of the contrasting color backing.

Transparent sheet or film material is known which can be cold formed and remain transparent and flexible. Further, transparent plastic materials are available which become substantially opaque when embossed or strained beyond their yield point.

BRIEF SUMMARY OF THE INVENTION

The present invention provides an embossable tape, web or sheet comprising a plurality of layers of deformable material. One of the layers is a carrier for a luminous material. When the tape is embossed with indicia, selective areas of the luminous material are exposed to provide luminous indicia on the embossed tape.

A primary object of the present invention is to provide an embossable tape which is capable of being cold embossed to exhibit raised indicia observable in the dark.

Another object of the present invention is to provide an embossable tape comprising a combined luminous layer and embossable layer which displays luminous indicia when embossed.

Another object of the present invention is to provide an embossable tape which is capable of being cold embossed to exhibit a luminous background field around raised dark indicia.

DESCRIPTION OF THE PREFERRED EMBODIMENT

Figure 1:
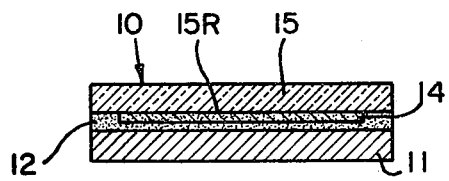
FIG. 1 is a section in elevation taken through a preferred embodiment luminous tape.
Figure 2:
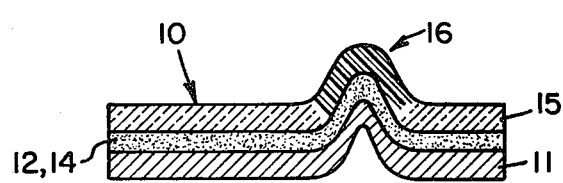
FIG. 2 is a section in elevation taken through a first modified embodiment of the tape shown in FIG. 1.

Refer now to FIGS. 1 and 2 showing preferred embodiments of the present invention adapted for operation in hand held embossing devices. The preferred embossable laminate tape 10 comprises a strippable backing layer 11, a layer of adhesive 12 adjacent thereto and a luminous layer 14 which may be mixed and combined with the adhesive layer 12 as best shown in FIG. 2. The adhesive is preferably of the pressure sensitive type and highly flowable or flexible to permit deformation without rupture during cold embossing. Facing layer 15 is a transparent embossable material which becomes opaque or substantially opaque when stressed or embossed. The facing layer may be made from unplasticized rigid polyvinyl chloride resin such as commercially available GENOTHERM (TM) UG 200. The strippable backing 11 may be made of paper, cardboard, plastic or other removable backing materials preferably having a smooth inner surface adjacent the adhesive layer 12. The luminous layer preferably comprises fine crystals of known luminous material in a transparent adhesive carrier. It will be understood that a layer of luminous material may be laid down on the reverse face 15R of facing layer 15 followed by a layer of adhesive 12 which traps and attaches the luminous layer 14 to the reverse face 15R of facing layer 15 as best shown in FIG. 1.

For purposes of this disclosure luminous material shall mean and include radiant materials which emit light, phosphorescent and fluorescent materials which emit light without heat or radiant effects and reflective materials, all of which will glow in the dark. Radioactive self-luminous compounds such as those used or luminous dials of watches and clocks are especially suitable when properly isolated and or sealed to avoid contamination. When sealing material, embossable material or a proper adhesive encapsulates the luminous layer or crystals of luminous materials they are effectively isolated from human contact. Before the tape 10 is embossed the backing layer protects the luminous material. After the tape is embossed and applied to a surface it is again protected by the supporting surface on one side and the embossable facing layer 15 on the front face. As will be explained hereinafter the luminous layer can be encapsulated by one or more of the other layers provided in the novel tape.

Figure 3:
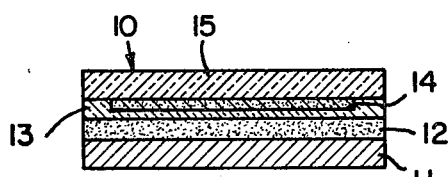
FIG. 3 is a section in elevation taken through a second modified embodiment of the tape shown in FIG. 1.

FIG. 3 shows an improved tape which may be employed to better seal the luminous layer 14. The luminous layer 14 after being applied to the reverse face of the transparent embossable facing layer 15 is covered with a sealing layer 13. Sealing layer 13 may be applied as a liquid layer or may be any film or foil which attaches to the luminous layer 14 and preferably seals the side edges of the luminous material layer 14.

After the transparent facing layer 15 is embossed, the area of embossing which was highly stressed becomes substantially opaque thus leaving embossment 16 dark on a luminous background. While the tape 10, having transparent facing layer 15, is preferably cold formable by well known hand embossing guns, hot formable embossing layers will operate in the same manner. The embossed areas or the area surrounding the embossed areas are changed from transparent to substantially opaque or vice versa, thus providing a luminous indicia.

Figure 4:
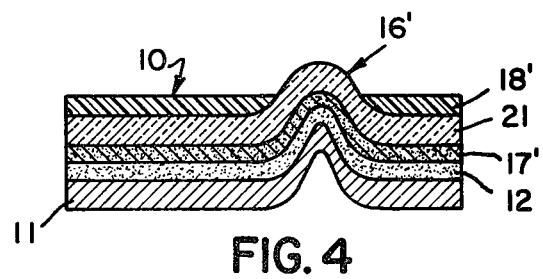
FIG. 4 is a section in elevation taken through another preferred embodiment luminous tape.
Figure 5:
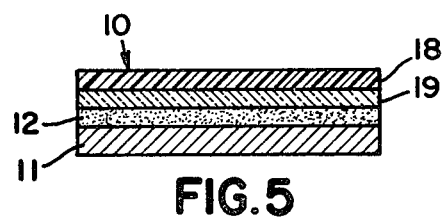
FIGS. 5 to 9 are sections in elevation taken through modified embodiments of the tape shown in FIG. 4.

FIG. 4 shows a preferred embodiment similar to FIG. 1 in that backing layer 11, adhesive layer 12 and luminous layer 14 are unchanged. A transparent embossable layer 17 which remains transparent after embossing is adjacent to and covers luminous layer 14. Plasticizer layer 18 is an opaque flexible film of plastic or other elastomer which is elastic up to a yield point exceeded by the pressure and stress of embossing. Beyond its yield point it completely and clearly ruptures and contracts away from the area of highest stress representative of the embossed region 16' leaving the underlying transparent embossing layer 17 exposed. Since layer 17 is transparent, luminous layer 14 is exposed to view. Indicia 16' will appear to glow in the dark through transparent embossable layer 17. Layer 18 may be made from well known plasticized film formed resins such as polyvinyl chloride, vinyl acetate, styrene and similar resins. Natural resins such as rubber and latex film may be used as a plasticizer layer. Transparent embossable layer 17 is of the non crazing type representative of Mylar (polyethylene terephthalate, poly carbonate, cellulose acetate and similar materials. It is known that transparent embossable materials of the type used to make layer 17 can be impregnated with pigments to make the layer opaque. Similarly, crystals of luminous material may be encapsulated in embossable layer 19, thus, luminous layer 14 of FIG. 4 may be merged into layer 17 as shown in FIG. 5.

When the embodiment of FIG. 4 employs a transparent embossable layer 17 which stays transparent after being embossed, the luminous layer 14 may be placed below the transparent layer 17 as described in FIG. 4 or may be held by or combined with the adhesive layer 12 as has been described with reference to FIGS. 1 and 2. It will be understood that luminous layer 14 is capable of glowing in the dark or emitting light whether placed in a solid or semi rigid adhesive paste like carrier.

Figure 6:
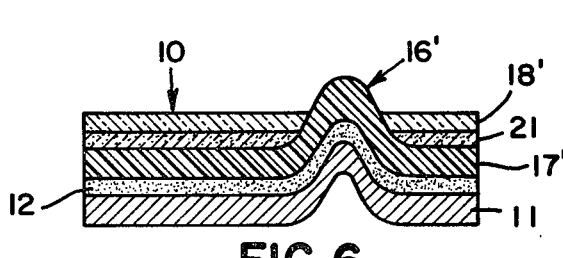

FIG. 6 is a modified form of FIG. 4 in which the luminous layer 21 is placed in front of an embossable layer 17'. In this embodiment the luminous material is preferably encapsulated in a highly transparent and highly flexible plastic 18' to avoid contamination and or deterioration. Embossable layer 17' may be made of transparent, opaque or translucent material since layer 17' is behind luminous layer 21 and will not be seen.

Figure 7:
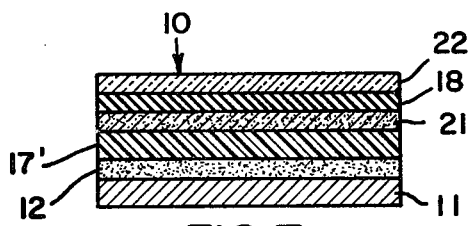

FIG. 7 is a modified form of FIG. 6 in which a sealing layer 22 is placed on front of plasticizer layer 18. Sealing layer 22 may be a highly flexible transparent thin film such as Mylar (TM) or may be applied as a liquid coating during preparation of tapes 10. By placing a sealing layer 22 over the luminous layer 21 a wider variety of suspension vehicles for supporting and carrying luminous crystals becomes available. For example, the luminous crystals may be placed on top of an elastic carrier because layer 22 will form an effective seal.

Figure 8:
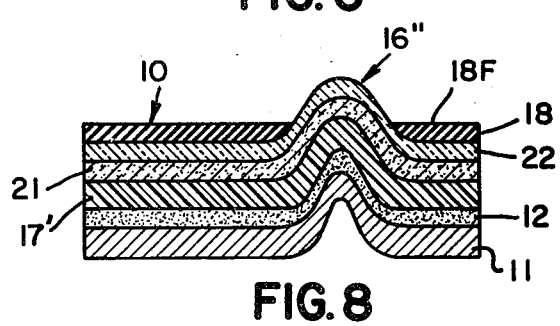

FIG. 8 is a modified form of FIG. 7 in which sealing layer 22 is placed directly adjacent and on top of luminous layer 21. The advantage of this embodiment is that plasticizer layer 18 is free and unattached on its top surface 18F which permits the layer to rupture cleaner and separate further from the point of rupture, thus displaying larger indicia 16'' at lower stresses and embossing pressures.

Figure 9:
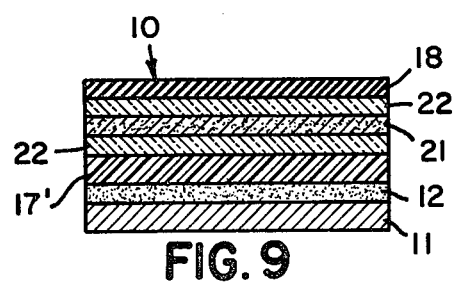

FIG. 9 is a modified form of FIG. 8 in which luminous layer 21' is sandwiched between two sealing layers 22. Since radioactive materials such as radium, tridium, promethium are highly self-luminous and extremely desirable for embodiment in the present invention, these layers should be prepared under rigid safety controls and quality controls. Luminous layer 21' may be prepared with extreme care by encapsulating it between two sealing layers 22 for later incorporation into tapes 10. It will be understood that such modified luminous layers 21' may be used in any of the embodiments herein before described, especially when the luminous layer is not combined with another layer such as transparent embossable layers 17, 17'.

Figure 10:
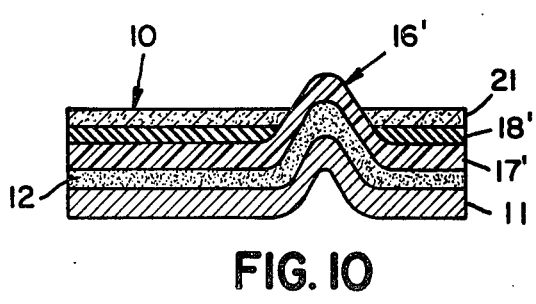
FIG. 10 is a section in elevation taken through yet another preferred embodiment luminous tape.

The plasticizer layer 18 has heretofore been described as an opaque layer that when ruptured permits the luminous layers 14 or 21' to be observed below the plasticizer layer 18. When non-poison, non-toxic and non-radio active luminous materials are employed, less care concerning exposure and/or contamination of the luminous layer is required. Accordingly, there is shown in FIG. 10 an embodiment in which the luminous layer 21 is placed on top of plasticizer layer 18'. It will be understood that the luminous crystals are preferably encapsulated in a transparent carrier, and for purposes of this explanation the plasticizer layer 18' can be made from transparent material, thus, layer 18' and layer 21 could lie in the same plane.

Having explained the various embodiments it will be understood that the act of embossing an embossable tape 10 either opens the embossed area revealing a light emitting luminous layer or conversely the whole tape is light emitting until embossed and the areas of embossment become dark areas on a light emitting background. Although the preferred embodiments have been explained with reference to embossable tape, the meaning of tapes shall include sheet and plate laminates for use as large embossable sign and displays.

We claim:

1. An embossable tape comprising:
   an embossable base layer of rigid synthetic organic resin embossable material having a front and a rear face, said material having a structure and composition which takes a permanent flow deformation upon being embossed,
   a luminous layer comprising luminous material parallel to and supported by said embossable layer and which takes the shape of said embossable base layer upon being embossed, whereby
   said tape is embossable to provide light emitting areas and light absorbing areas defining luminous indicia on the front face of said tape.

2. An embossable tape as set forth in claim 1 which further comprises a pressure sensitive adhesive layer attached to the rear face of said tape.

3. An embossable tape as set forth in claim 2 which further comprises a strippable backing layer selected from the group consisting of paper, cardboard or plastic attached to said adhesive layer.

4. An embossable tape as set forth in claim 1 wherein said luminous layer lies in the same plane as said adhesive layer or said embossable layer.

5. An embossable tape as set forth in claim 1 wherein said embossable layer is transparent and forms the front face of said tape, said embossable layer comprising a synthetic resin having a structure and composition such that permanent flow deformation thereof with embossments renders said embossable layer opaque in the area of said embossments.

6. An embossable tape as set forth in claim 5 wherein tape comprises a laminate in which said transparent embossable layer comprises the front face and the luminous layer is attached to the rear face of said embossable layer.

7. An embossable tape as set forth in claim 1 which further comprises a plasticizer layer supported on the front face of said embossable base layer, said plasticizer layer comprising an elastic material selected from the group consisting of natural rubber or synthetic material which ruptures and exposes the raised embossments in said tape.

8. An embossable tape as set forth in claim 7 wherein said luminous layer is connected to said plasticizer layer and ruptures to expose said raised embossments in said embossable layer.

9. An embossable tape as set forth in claim 7 wherein said plasticizer layer is opaque and when ruptured by said embossment in said tape reveals areas which define said luminous indicia.

10. An embossable tape as set forth in claim 1 wherein said luminous layer is sealed from exposure to the atmosphere.

11. An embossable tape as set forth in claim 10 which further comprises at least one sealing layer comprising polyethylene terephthalate polycarbonate or cellulose acetate for encapsulating said luminous layer.

* * * * *